Sept. 6, 1949. P. C. J. DELACHAUX 2,480,912
TROLLEY COLLECTOR HEAD
Filed Oct. 29, 1945
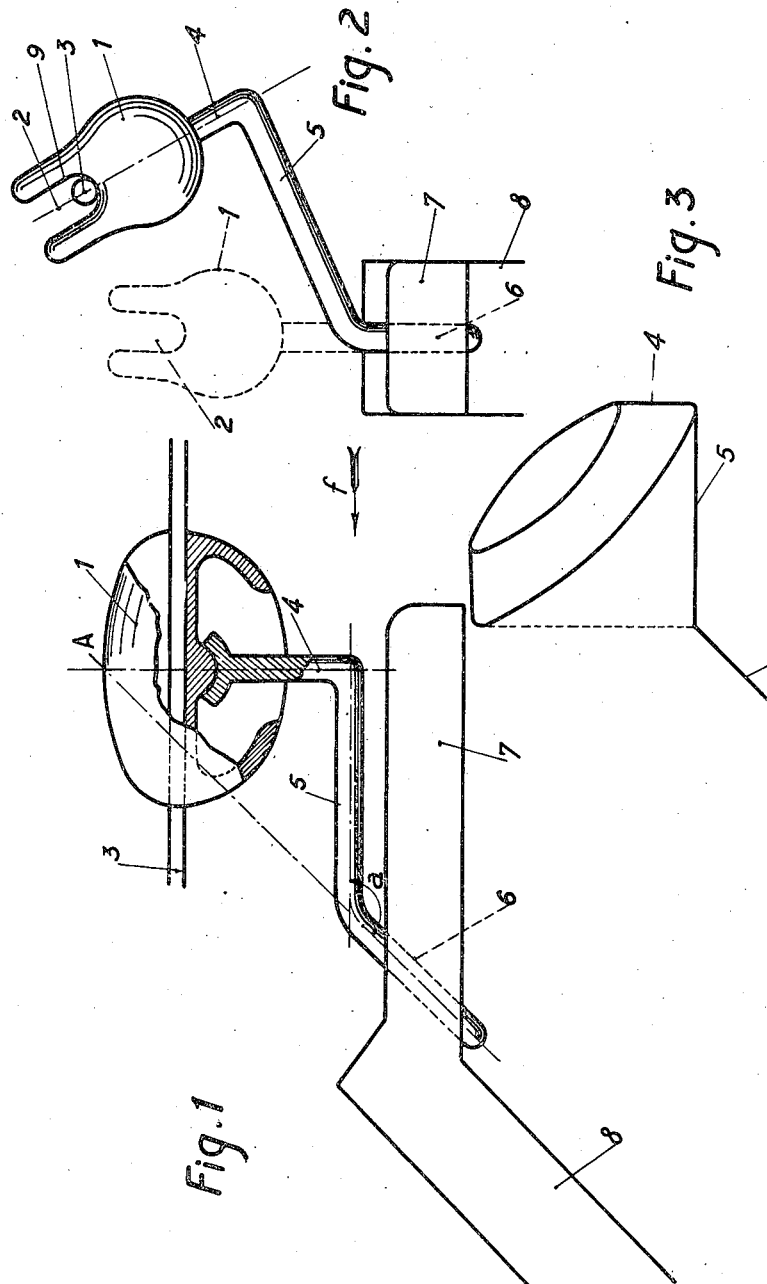

Patented Sept. 6, 1949

2,480,912

UNITED STATES PATENT OFFICE 2,480,912

TROLLEY COLLECTOR HEAD

Philippe Charles Jean Delachaux, Paris, France, assignor to Acieries de Gennevilliers, Gennevilliers, Seine, France Application October 29, 1945, Serial No. 625,362
In France March 17, 1944

Section 1, Public Law 690, August 8, 1946
Patent expires March 17, 1964

2 Claims. (Cl. 191—60)

It is known to use a trolley pole provided on its top end with a head carrying a rubbing contactor intended to take current from the overhead electric wire for feeding a motor vehicle, such contactor being adapted to rotate about three axes perpendicular to one another and its rotation about one of such axes having for result to modify the inclination of its grooved walls and to bring the latter towards the vertical position, and even beyond, for keeping them in touch with the wire and thus preventing the contactor from escaping the wire, that is to say for avoiding disengagements of the pole.

According to the present invention, a similar effect of inclination of the contactor grooved walls is obtained with the aid of means that are simpler in construction and different from a rotation about an axis substantially parallel to the wire.

According to one feature of the present invention there is provided a grooved rubbing contactor mounted on the top end of an axle which is connected by an integral linking member with an inclined axle adapted to rotate in an appendage provided on the top end of the pole the axes of both axles meeting above the level of the wire, so as to cause said contactor to keep in touch with the wire with a view to preventing disengagements of the pole.

According to another feature of the invention means have been provided so that, when the pole is in its normal working position, as on straight wire sections, the axle carrying the grooved rubbing contactor is vertical, while the linking member connecting said axle with the inclined loosely rotatable axle is horizontal, with a result that the rubbing contactor constantly straddles the wire, thereby positively avoiding disengagements of the pole.

According to a further feature of the invention, the provision made for free rotation in the pole appendage of the assembly comprising the grooved rubbing contactor, its supporting vertical axle and the horizontal linking member connecting this axle with the inclined axle loosely rotatable in the said appendage, acts to increase pressure of the contactor on the electric wire at the moment of lateral efforts of the pole, as on track curvatures, whereby pole disengagements are positively avoided.

According to a still further feature of the invention, the assembly comprising the grooved rubbing contactor, its supporting vertical axle and the horizontal linking member connecting this axle with the inclined axle loosely rotatable in the said appendage, acts to decrease the coefficient of friction between the electric wire and the grooved rubbing contactor sliding thereon, thereby decreasing wear and tear of the contactor. For this reason the pole head is particularly suitable for high speeds which at curves produce considerable centrifugal force.

Further features of the invention will be apparent from the following description with reference to the accompanying drawing which shows, by way of example, an embodiment thereof, and in which:

Fig. 1 is a diagrammatic elevational side view with part in section showing the pole head in its operational position on a straight overhead electric wire;

Fig. 2 is a diagrammatic rear end view showing the rotatable assembly in a position, as on a track curvature; in which the contactor carrying axle forms an angle with the pole, Fig. 3 is a diagrammatic showing of various positions likely to be occupied by the contactor carrying axle where the inclined axle has rotated through 180°.

The device comprises a rubbing contactor 1 provided with a groove 2 the bottom which contacts an electric wire 3. The contactor is swivel-mounted, as in known arrangements, so as to be able to oscillate in a vertical plane passing through the wire 3; it may also pivot through 360° in the horizontal plane passing through the wire 3.

The grooved rubbing contactor 1 is supported by an axle 4 substantially vertical in the working position of the pole on straight sections of the electric wire 3. The axle 4 is connected, by means of a substantially horizontal link member 5, with an inclined axle 6 which serves as a support for the movable assembly 1—4—5 and is pivotally mounted on a substantially horizontal appendage 7 provided on the top end of the pole 8. The angle $a$ formed between the linking member 5 and the inclined axle 6 is superior to 90°.

The axes of axle 4 and of axle 6 converge at a point A above the level of wire 3.

When the movable assembly 1—4—5 is caused to pivot together with the axle 6, it is visible in Fig. 2, wherein the angle of pivoting has, for the sake of simplicity, been supposed to be of 90°, and, consequently, both the link 5 and axle 4 are located in the plane thereof, that the link 5 and the axle 4 perpendicular thereto, as well as the grooved rubbing contactor 1, are all inclined accordingly. By comparing the position of start (indicated by dotted lines, Fig. 2), from which the contactor 1 has slid on the electric rectilinear wire 3, with the position (indicated by full lines) reached by the assembly, for example on a track curvature where a centrifugal effort has been exerted on the pole in the direction indicated by arrow f, it is found that the pivoting of the axle 6, together with the link 5 and axle 4, has had two main sequels as follows:

On one hand, the axle 4 and hence the edge 9 of groove 2 have assumed an inclined position such as to straddle the wire 3 in such a way that the passage of current therethrough is assured, since the very action of the effort in the direction of arrow f tends to bring the wire 3 into the lower portion of the groove 2 of contactor 1.

On the other hand, the grooved contactor 1 has been raised, as is particularly visible by comparing its position indicated by full lines in Fig. 2, with its position of start indicated therein by dotted lines. Indeed, because of the inclination of the axle 6 (Fig. 3), there is described by the axle 4 a frustum cone having for its axis the axle 6. Should the axle 4 revolve through 180°, it would assume its highest position as conditioned by the said cone, and intermediate positions progressing from its lowermost position as illustrated by the cone. In reality, it is clear that the wire 3 remains in a stationary position, hence it will be the pole that will lower, so that pressure of the grooved contactor 1 on the wire 3 will increase whenever the centrifugal effort will be exerted on the pole, thereby increasing the resistance to disengagements of the pole.

It is to be noted that the centrifugal efforts of the pole are elastically absorbed on the travelled path represented by the circular arc described by the contactor 1, and the centrifugal effort of the pole is substantially reduced in its repercussion on the point of support of the contactor 1; for this effort is to be divided by the time required to travel over said circular arc.

Finally, a further advantage of the device according to the invention, consists in reducing wear and tear of the grooved contactor 1.

It is, in fact, known that when a body acted upon by gravity and resting on a plane surface is intended to be displaced thereon in a desired direction, such displacement is more difficult to effect in the case of the body being initially immovable than in the case of its moving in the direction perpendicular to the afore-said direction, for the coefficient of friction is smaller in the second-mentioned case.

In the device according to the present invention, the rubbing contactor 1 when sliding on the wire 3 effects a kind of oscillating motion in substantially horizontal planes passing through the wire 3 and perpendicular to the contactor vertical axis, that is to say of the kind referred to in the above second-mentioned case, resulting in reducing the coefficient of friction, thereby reducing wear and tear of the contactor 1.

What I claim is:

1. A trolley pole head for taking current from the overhead electric wire to feed a motor vehicle comprising in combination a pole, a grooved rubbing contactor the groove of which receives the electric wire, an axle rotatably supporting said contactor at one end and being substantially vertical for a straight part of the wire, a link integral with the opposite end of said axle disposed substantially horizontal for a straight part of the wire, and an axle integral with the other end of said link and pivotally mounted in an inclined position in the top end of the pole, the axes of both axles intersecting above the plane of the wire, so as to cause said contactor to constantly straddle the electric wire.

2. A trolley pole head for taking current from the overhead electric wire to feed a motor vehicle comprising in combination a pole, a grooved rubbing contactor the groove of which receives the electric wire, an axle supporting said contactor on one end by a swivel joint and being substantially vertical for a straight part of the wire, a link integral with the opposite end of said axle disposed substantially horizontal for a straight part of the wire, and an axle integral with the other end of said link and pivotally mounted in an inclined position in the top end of the pole, the axes of both axles intersecting above the plane of the wire, so as to cause said contactor to constantly straddle the electric wire.

PHILIPPE CHARLES JEAN DELACHAUX.

REFERENCES CITED

The following references are of record in the file of this patent:

UNITED STATES PATENTS

| Number | Name | Date |
| --- | --- | --- |
| 722,379 | Oler | Mar. 10, 1903 |
| 928,016 | Adams | July 13, 1909 |
| 1,225,926 | Carmack | May 15, 1917 |
| 2,151,804 | Schaake | Mar. 28, 1939 |

FOREIGN PATENTS

| Number | Country | Date |
| --- | --- | --- |
| 703,910 | France | May 8, 1931 |